March 12, 1935.   S. PRZYBOROWSKI   1,994,436
MEANS FOR PRODUCING SOLDERED JOINTS
Filed June 2, 1932   6 Sheets-Sheet 1
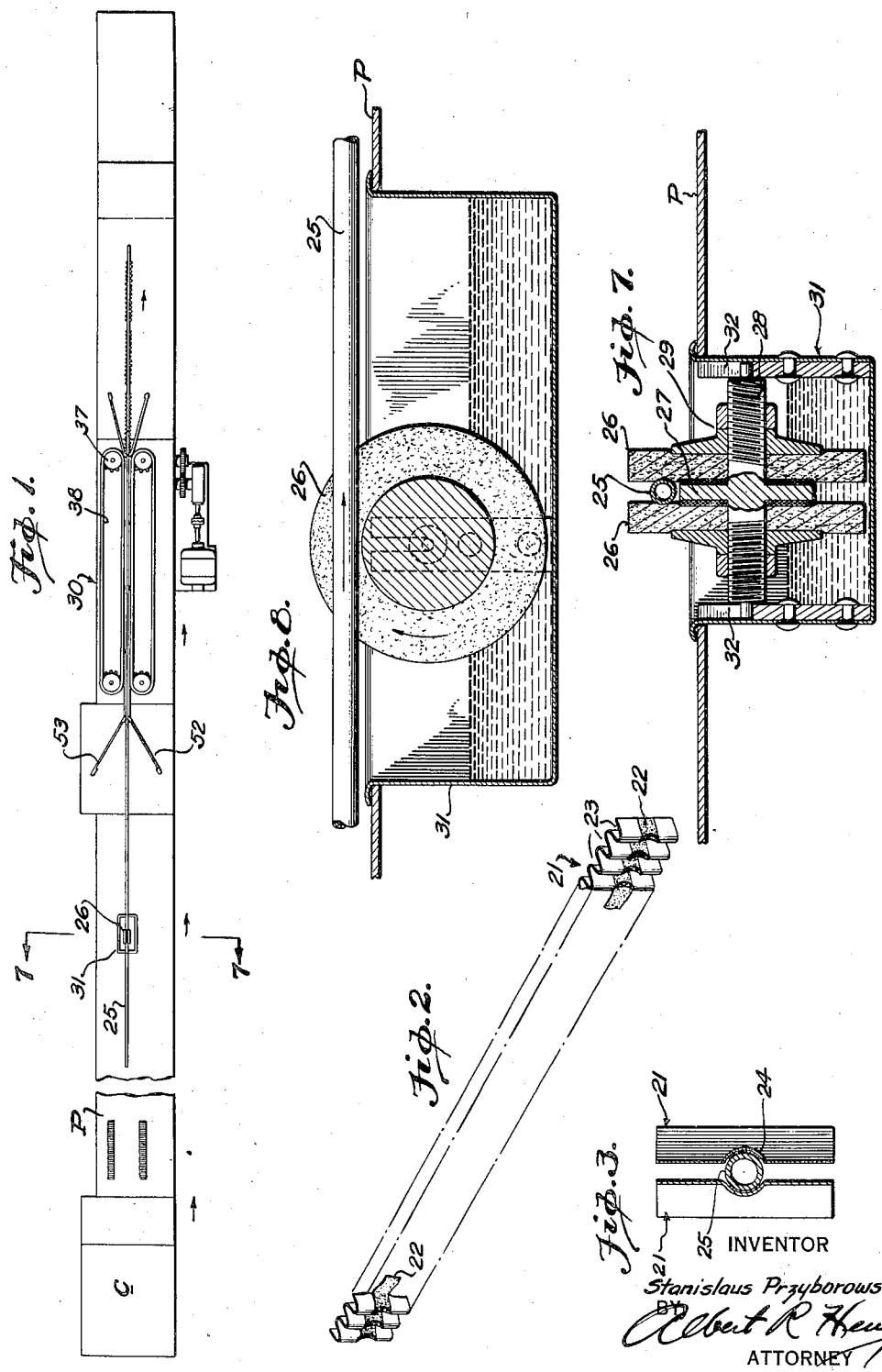
INVENTOR
Stanislaus Przyborowski
BY Elbert R. Henry
ATTORNEY

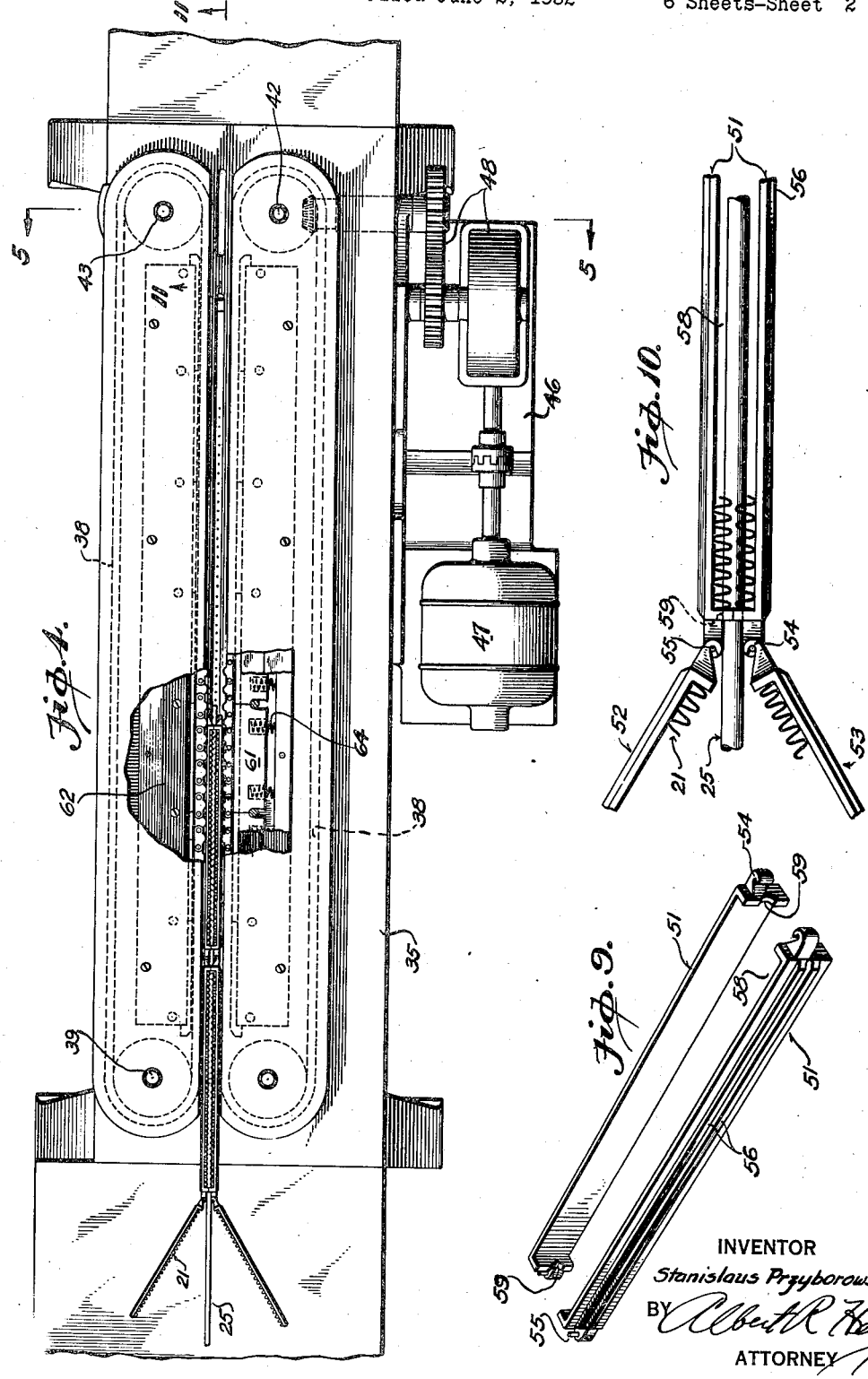

March 12, 1935.                  S. PRZYBOROWSKI                    1,994,436
                       MEANS FOR PRODUCING SOLDERED JOINTS
                           Filed June 2, 1932          6 Sheets-Sheet 3
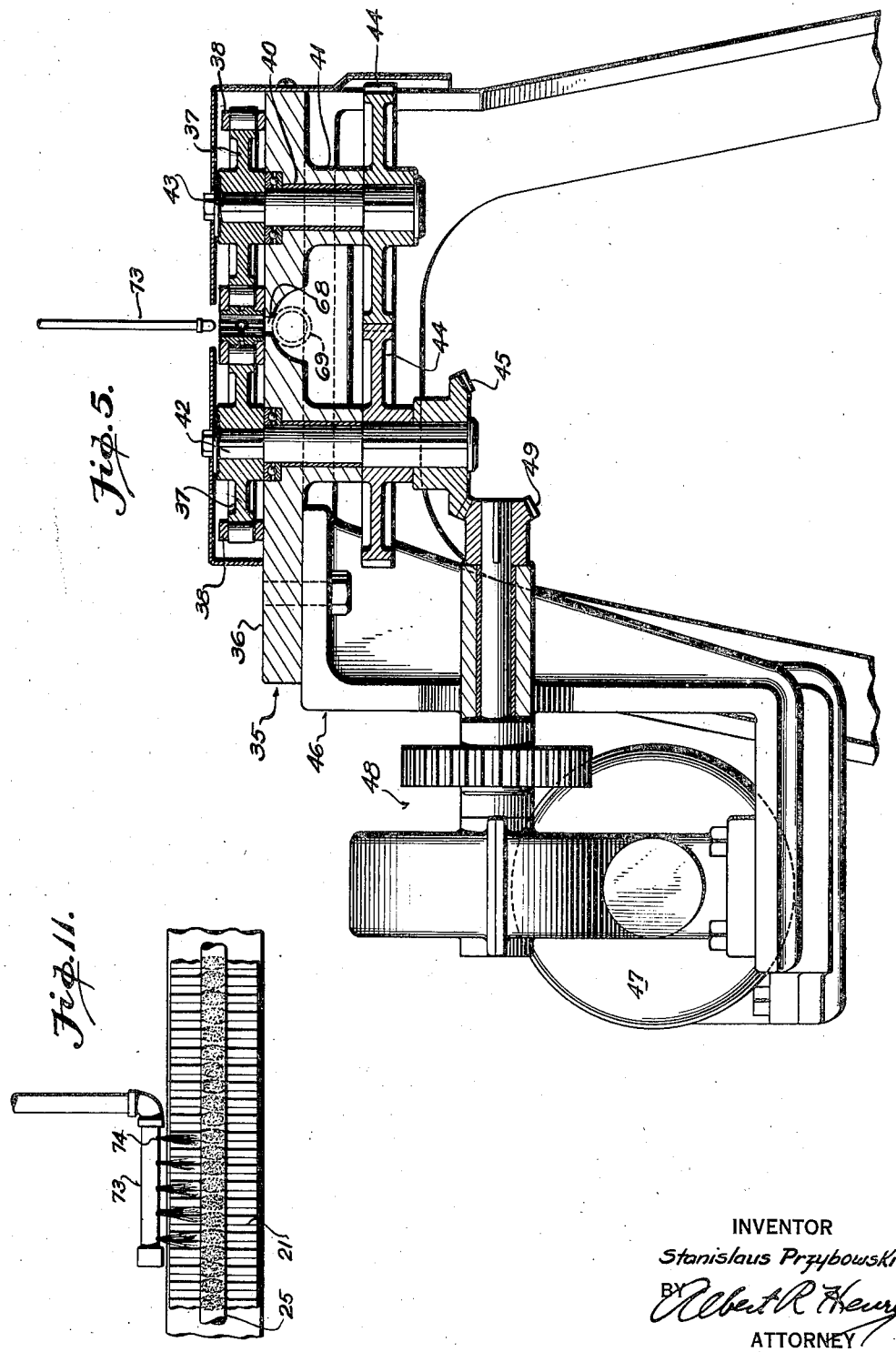
INVENTOR
Stanislaus Przybowski
BY Albert R. Henry
ATTORNEY

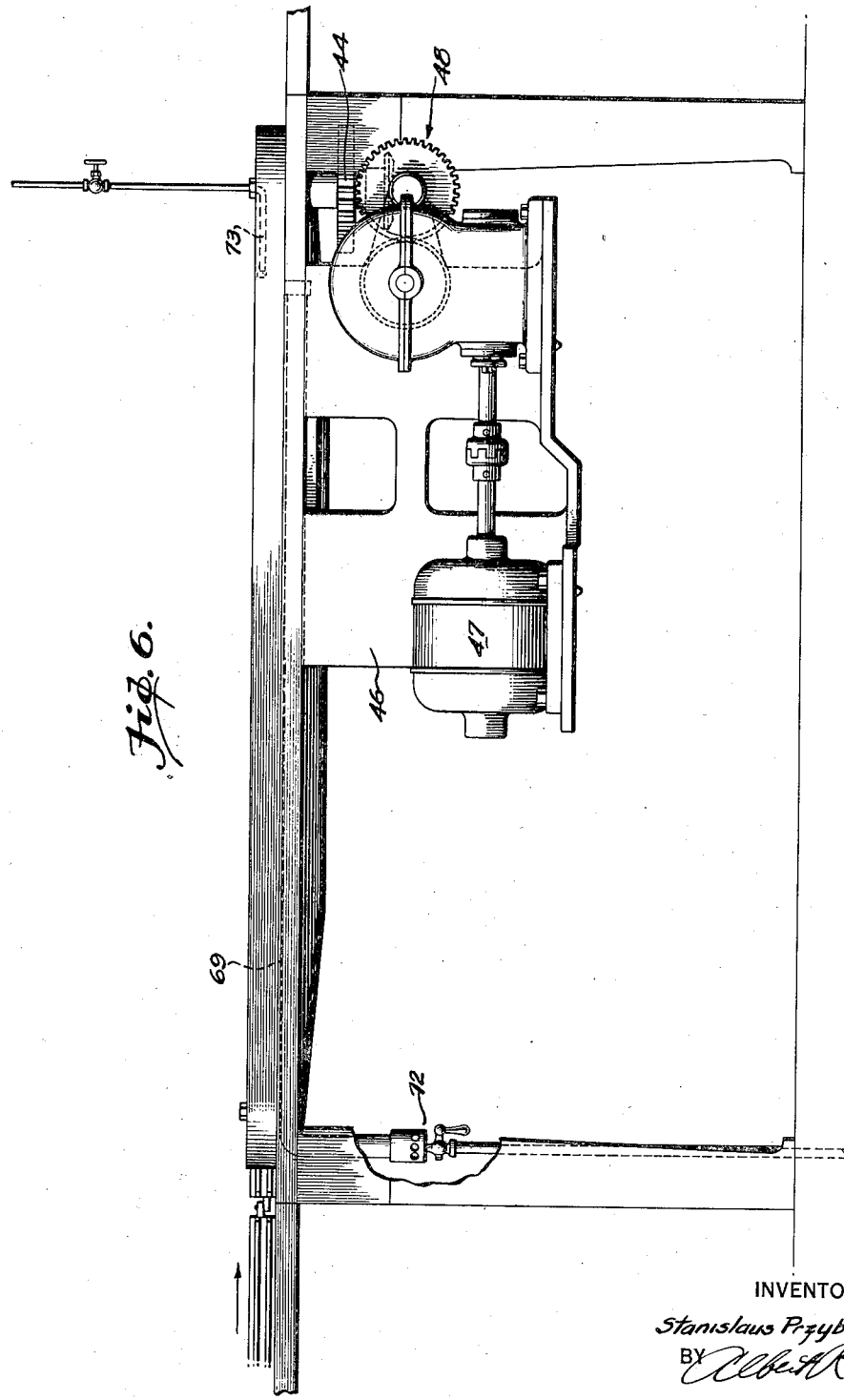

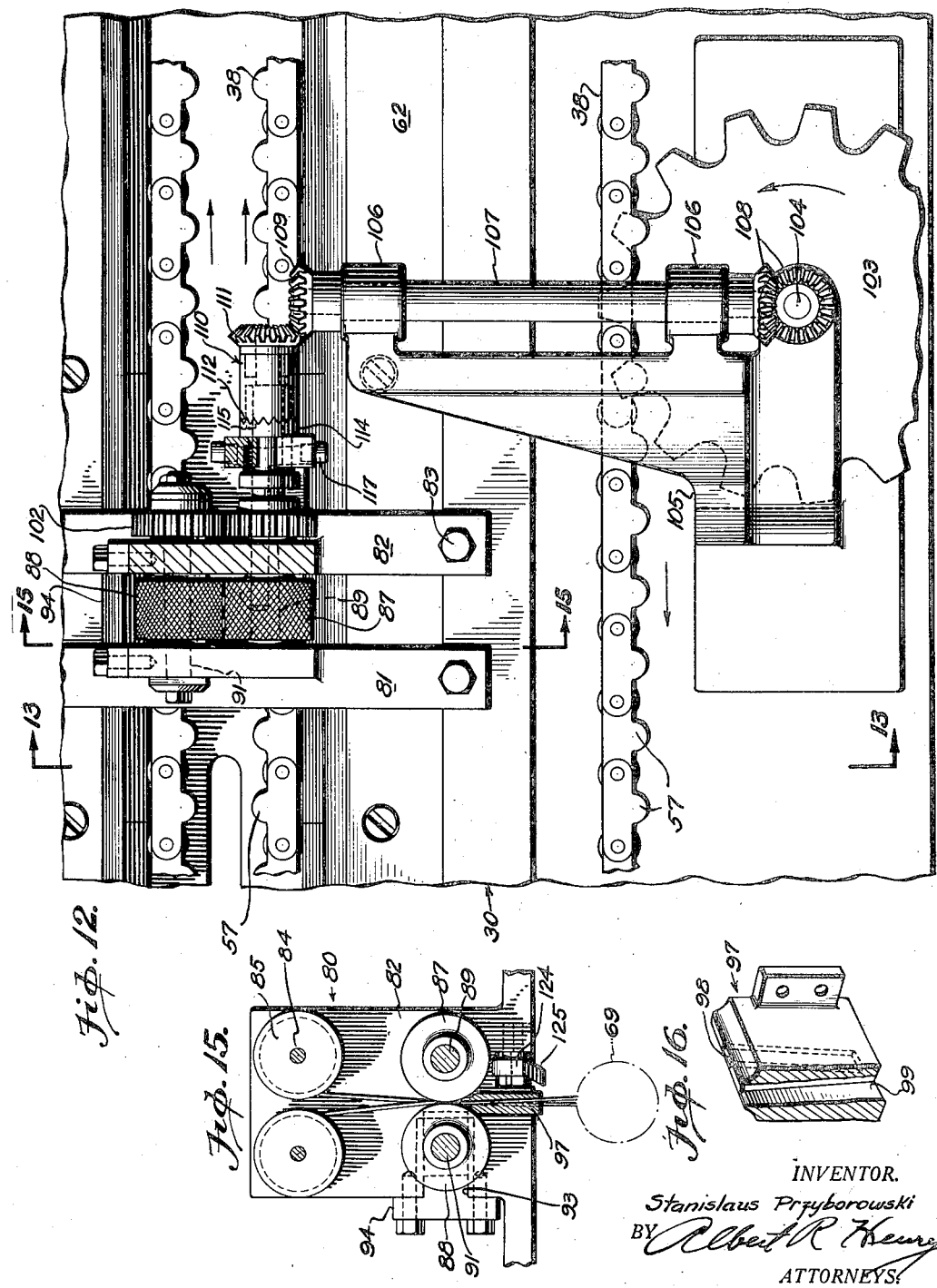

March 12, 1935. S. PRZYBOROWSKI 1,994,436
MEANS FOR PRODUCING SOLDERED JOINTS
Filed June 2, 1932 6 Sheets-Sheet 6
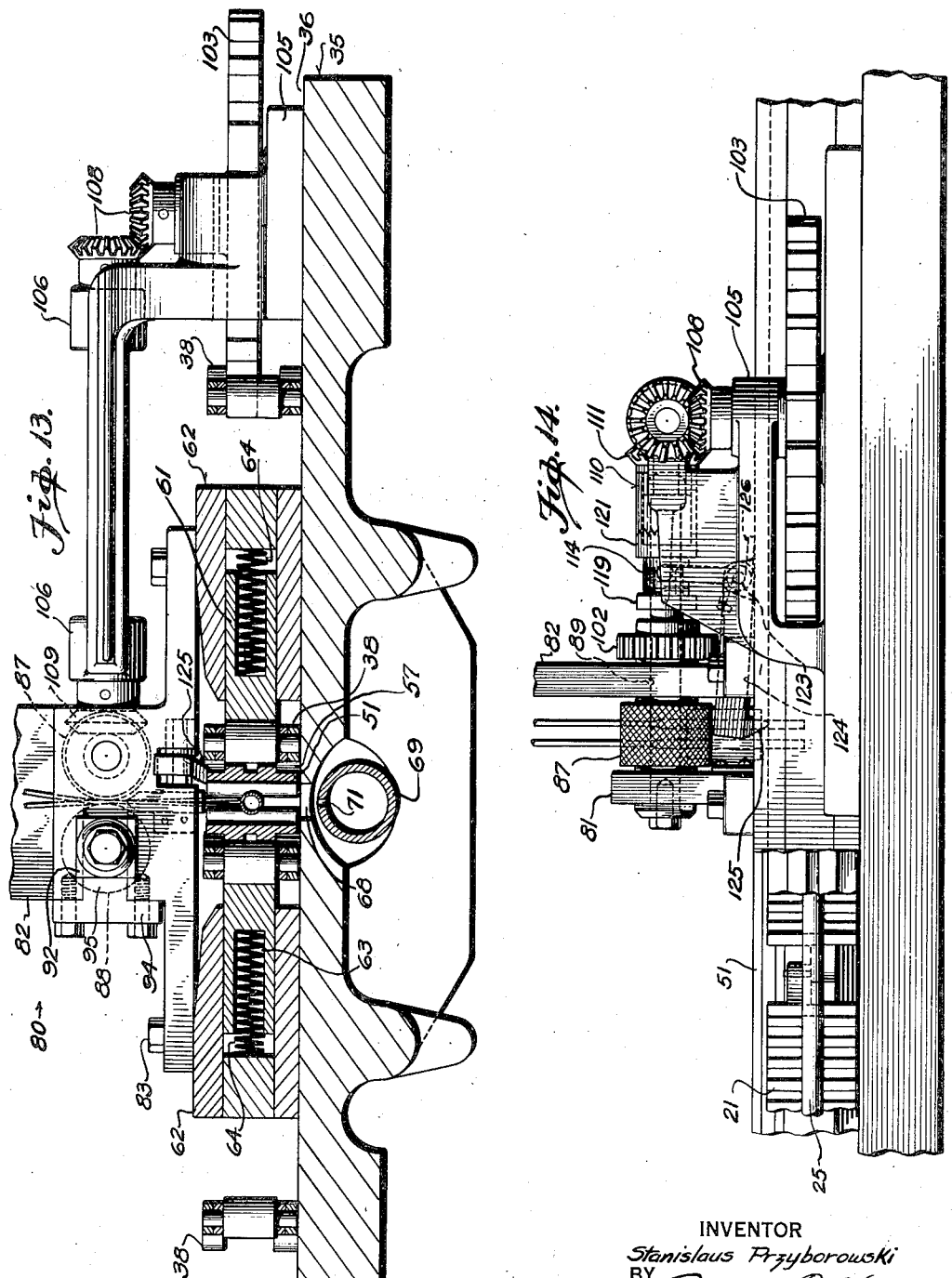
INVENTOR
Stanislaus Przyborowski
BY
ATTORNEY Patented Mar. 12, 1935

1,994,436

UNITED STATES PATENT OFFICE 1,994,436

MEANS FOR PRODUCING SOLDERED JOINTS

Stanislaus Przyborowski, Buffalo, N. Y., assignor to Fedders Manufacturing Company, Inc., Buffalo, N. Y.

Application June 2, 1932, Serial No. 614,923

13 Claims. (Cl. 113—59)

This invention relates to means for producing soldered joints between metallic members and its has particular reference to a machine for soldering formed sections of fin ribbon to tubing for the production of heat exchange devices.

It has been customary to pre-form strips of light gage metal into continuous fin sections adapted to seat on a condenser or radiator tube to obviate the labor of handling and assembling individual fins. The soldering or securing of the fins to the tubes, however, has not been simplified by this proposal, and has remained a laborious and exacting task. In the present invention a machine has been devised to effect the assembly of this type of fin ribbon to a tube and, briefly, it consists of a conveyor device designed to engage successive ribbon and tube units and to convey the same through a heated zone wherein the fins are soldered or otherwise united to the tube. Various details are also provided for, such as the automatic application of flux before the heating step and the quenching of the integrated members subsequent to the heating operation.

In one form of the invention, the solder is disposed between the fins and the tubing before the parts are mutually united, while in another embodiment solder is separately fed into the machine and brought into direct contact with heated members for a soldering operation. These and other features of the invention are more specifically set forth in the specification and accompanying drawings, wherein:—

Fig. 1 is a diagrammatic top view showing the soldering machine and associated units.

Fig. 2 is a perspective view showing a portion of composite fin ribbon prior to assembly.

Fig. 3 is a cross section through the fin ribbon and tube assembly.

Fig. 4 is an enlarged top plan view of one embodiment of the invention, with portions broken away to show the pressure pad structure.

Fig. 5 is an enlarged section on the line 5—5 of Fig. 4.

Fig. 6 is a side elevation of the machine.

Fig. 7 is an enlarged section on the line 7—7 of Fig. 1 showing the details of the flux applying device.

Fig. 8 is a longitudinal section through the flux applying device.

Fig. 9 is a perspective view of a pair of holding jigs.

Fig. 10 is an elevation showing the holding jigs in operation.

Fig. 11 is a section on the line 11—11 of Fig. 4 with portions omitted to show the cooling spray device.

Fig. 12 is a fragmentary top view of a further embodiment of the invention.

Fig. 13 is a section on the line 13—13 of Fig. 12.

Fig. 14 is a side view of the device as shown in Fig. 12.

Fig. 15 is a section on the line 15—15 of Fig. 12 particularly showing the solder wire feed and flattening devices.

Fig. 16 is a perspective view of a wire guide with portions broken away to show the guideway arrangement.

Referring particularly to Figs. 2 and 3, it will be observed that the fin ribbon 21 is provided with a solder strip insert 22 and that both are deformed to provide corrugations 23, each having a longitudinal saddle portion 24 at one crest adapted to receive a sector of a condenser tube 25. For the present purposes, the sections of ribbon are arranged in opposed pairs on the tube 25 and the pairs are spaced from each other so that, subsequent to the soldering operation hereinafter described, such spaced portions may be formed into bent portions to provide a condenser or like heat exchange coil.

The soldering machine, indicated by the numeral 30 in Fig. 1, may be advantageously associated with a ribbon corrugating machine C, wherein the sections of ribbon are delivered to a connecting platform P for subsequent manual fitting to the elongated tube 25 within the confines of a jig unit forming part of the soldering apparatus. Prior to entering the soldering apparatus, the tube 25 is drawn between a pair of flux applying rollers 26 for receiving an application of flux preparatory to the soldering operation. The tube portion leaving the machine is automatically released by the holding jigs and presents an appearance as shown in Fig. 1 wherein the corrugated ribbon strips are permanently secured at spaced intervals. These assembled portions may eventually enter a bending unit where the tube is bent into convolutions suitable to provide a coil.

The flux applying rollers 26 are spaced discs of felt or like material (Figs. 7 and 8) mounted on opposite sides of a central circular flange 27 of an idler shaft 28 and they are retained in such position by suitable nuts 29 and interposed washers mounted on this shaft. The shaft is removably mounted in a flux containing tank 31 provided with open bearings 32 for receiving the same. The tank is conveniently mounted in a recess provided in the platform P and is adapted to contain a supply of flux in which the lower portions of the rollers are immersed.

The soldering machine 30 generally comprises a machine base 35 (see Figs. 4, 5 and 6), formed with a horizontal face 36 upon which are mounted a plurality of sprockets 37 adapted to receive chains 38 forming the conveying means for the previously mentioned jigs (Fig. 4). The two left hand or driven sprockets are secured to studs 39 which are received in bushings similar to the bushings 40 mounted in bosses 41, and the two remaining sprockets are secured to studs 42 and 43, respectively mounted in similar bosses, and they are connected for unitary movement by attached gears 44. The stud 42 is connected to a drive mechanism by means of a bevel gear 45 secured thereto, whereby both chains are driven at a similar rate of speed.

The driving mechanism for the conveying means is mounted on a bracket 46 secured to the machine base 35 (Fig. 6), and it comprises a motor 47 and a reducing gear train, generally indicated by the numeral 48, terminating in a driven bevel gear 49 in meshing engagement with the bevel gear 45 of the stud 42.

As shown in Fig. 9, the ribbon holding jigs 51 are elongated members, linked together to form two chains 52 and 53 which are received between the adjacent or inner legs of the driving chains 38. Specifically, each jig is formed with a hook 54 (Figs. 9 and 10) at one extremity and a pin 55 at the opposite extremity, respectively adapted to engage the pin and hook on adjacent jigs to provide a detachable connection. The outer face of each member is formed with parallel raised tracks 56 adapted to receive projecting lugs 57 of the drive chain links (Figs. 4 and 13), and the inner face is formed with an open pocket 58 for receiving a ribbon section 21 and it also contains arcuate notches 59 in its end walls for engaging the tube 25. The adjacent jigs in the two jig chains are arranged to register as shown in Fig. 10, and, when clamped to the tube as hereinafter described, they are proportioned to compress the somewhat resilient fin sections into tight engagement with the tube.

The inner legs of the drive chains 38 are retained in frictional driving contact with the jig chains 52 and 53, received therebetween, by means of a plurality of spring thrust pressure blocks 61 (Figs. 4 and 13) arranged adjacent each of such legs of the drive chains. These blocks are mounted for sliding movement in open housings 62 secured to the base 35 and each block contains drilled holes 63 adapted to mount a compression spring 64 for engagement with the wall of the housing 62.

It will be observed that the fin filled jigs entering between the drive chains are tightly engaged with the accompanying tube upon entering the zone of the pressure blocks 61, and that this pressure is maintained by the springs 64 during transit through the apparatus.

Means are provided for heating the tube and fin assemblies while in transit in the conveying chains, which herein comprises a gas burner 69, formed with a series of nozzle openings 71 registering with a slot 68 formed in the base 35 (Figs. 5 and 13) and it is adapted to direct jets of ignited gas to the overlying fin sections during movement thereof. The end of the burner projects downwardly to a supply pipe which is provided with a mixing and shut-off valve 72 for controlling the volume of gas delivered to the burner (Fig. 6).

Subsequent to passing the burner 69, the fin and tube assembly passes under a pipe 73 which is connected to a water supply and which contains nozzle openings 74 for directing streams of cooling water on the heated assembly (Figs. 4 and 11).

In assembling the fin sections with the tube it will be noted that, due to the link arrangement of the jigs, a hinging or spreading movement is obtainable to present a generous opening for the assembling operation, and, during its subsequent action they form self closing dies. Succeeding the assembling operation, the filled jig is slowly drawn over the burner 69, whereupon the solder portions of the ribbon are fused while under pressure of the blocks 61 and finally the entire assembly is cooled and washed under the water spray from the pipe 73 to complete the soldering operation. Upon leaving the soldering apparatus each pair of jigs is detached from the succeeding jigs and is returned to the loading station.

It is contemplated that sections of fin ribbon 21 may be provided without the solder insert 22; and, in this event, means are provided to direct a ribbon or wire of solder into the previously described jigs in the heating zone to secure the tube to the ribbon. This phase of the invention is shown in Figs. 12–16, and it chiefly consists of the provision of a solder feed device 80 for the mechanism heretofore described.

The feed device 80 comprises a pair of spaced bearing brackets 81 and 82 mounted transversely of the inner legs of the jig chains and secured to the housings 62 by means of screws 83. The bracket 82 contains studs 84 at its upper extremity for rotatably receiving a plurality of spools 85 containing round solder wire. Immediately below the spools 85 a pair of driven flattening rollers 87 and 88 are mounted which are adapted to withdraw wire from the spools 85 for flattening and conveyance to the underlying heated tube and fin ribbon assemblies.

The roller 87 is mounted on a driven shaft 89 which extends through a suitable bearing in the bracket 82 for attachment to this roller. The remaining roller 88 is formed with an oppositely extending shaft portion 91 which is received in a bearing block 92. The bearing block is slidably mounted in transverse slots 93 in the brackets and it is retained in a definite position relative to the roller 87 by a cap member 94 which is secured to both brackets and is formed with portions 95 in engagement therewith.

As shown in Fig. 15, the flattened wires, delivered by the rollers 87 and 88, enter a guide device 97 secured to the bracket 82 and formed with rectangular passages 98 and 99 arranged at a slight angle relative to each other to direct a ribbon of solder to opposite sides of the center of the heated tube 25. (Figs. 15 and 16).

The rollers 87 and 88 are connected for unitary rotation by intermeshing gears 102 secured to the driven shaft 89 and the shaft 91 respectively, and a drive mechanism is provided to operate the shaft 89. This mechanism comprises a sprocket 103 (Fig. 12) mounted on the bed 35 by a shaft 104 and adapted to be actively engaged by the drive chain 38. A bracket 105 is also mounted on the bed 35 and is formed with bearings 106 which receive a shaft 107. This shaft is driven by the sprocket shaft 103 through the medium of bevel gears 108 and it also carries a second bevel gear 109 meshing with a gear 111 of the driven shaft 89. The gear 111 is rotatably mounted on the shaft 89 and it carries a clutch member 110 formed with clutch teeth 112. A sliding clutch member 114 is keyed to the shaft 89 and is slidable thereon to engage its clutch teeth 115 with the teeth 112 of the clutch 110, thus connecting the shaft 89 for operation by its driving means.

Means are provided for controlling the operation of the feed rollers 87 and 88 in response to the presence of the jig members in the heating zone (Figs. 12, 13 and 14). This comprises a yoke 117 having bearing portions 118 engaging the clutch member 114 and retained between shoulders 119 and 121 thereon. The yoke extends downwardly and is formed with a hub 122 pivotally mounted on the housing 62 by a pin connection 123. An arm 124 extends from the hub portion and terminates in a cam portion 125 which is disposed in the path of the jig sections and is adapted to be engaged and lifted to throw the clutch into engagement. A spring 126, secured to the arm 124 and the base 35, imparts a downward load on the arm sufficient to release the clutch jaws.

The operation of the last described embodiment of the invention is substantially similar to that of the first embodiment, with the exception that the solder ribbon is applied at a point in the heating zone where it immediately becomes fused upon contact with the moving tube 25 and flows about the saddle portions of the fins 21 to connect the same. During this operation the solder wire is fed continuously by means of the rolls 87 and 88, and being flattened therein, it is readily fusible upon engaging the moving tube. When the last of the jig sections in the tube assembly passes the rolls 87 and 88, the cam portion 125 of the operating arm 124 is unsupported and the arm is then drawn downwardly under urge of the spring 126, thus moving the sliding clutch member 114 out of engagement with the driving mechanism to prevent further feeding of solder. Upon the entry of a new jig chain unit in the apparatus, the arm 124 is again actuated upwardly to engage the clutch mechanism whereby the solder wire is again fed to the heated tube section.

It will be obvious that the invention of the soldering apparatus may be applied in numerous manners and with numerous other articles without departing from the principles above described. For example, with sufficient floor space, the extremities of the jig chains could easily be connected to form endless jig devices. The apparatus may also be varied to solder products of different shapes than the tube and fins herein illustrated, and in such event the jig proportions could be varied to suit the product.

I claim:

1. In a device for connecting a fin section member to a tube member, conveying means, jig members formed to engage said tube and having means for receiving said fin sections for retaining the same in intimate engagement with said tube, said jig members being adapted to be fed into said conveying means for movement thereby, means for heating said tube during transit, and means operated in timed relation to said conveying means for feeding solder wire to said heated tube for fusion thereon to connect said tube and fin sections.

2. In a device for connecting fin section members to a tube member, wherein one of said members is provided with a solder insert, conveying means, jig members formed to engage said tube and having portions for receiving said fin sections in intimate engagement with said tube, and a heating element adjacent said conveying means, said jig members being adapted to be fed into said conveying means for movement thereby, whereby the tube and fin sections therein are heated during transit by said heating element to fuse the solder.

3. In a device for connecting a fin section member to a tube member, wherein one of said members is provided with a solder insert, conveying means, jig members formed to engage said tube and having portions for receiving said fin sections, said jig members being adapted to be fed into said conveying means for movement thereby, pressure pad means for engaging said jigs during transit to press said jigs to said tube whereby said fin sections are retained in intimate engagement with said tube, and a heating element adjacent said conveying means for fusing said solder during transit of said members.

4. In a device for connecting fin section members to a tube member wherein one of said members is provided with a solder insert, a jig member comprising a body having a pocket formed to receive a fin section and spaced seat portions engaging said tube, said fin sections intimately engaging said tube, a heating element, and means for moving said jig member and accompanying tube and fin section over said heating element to fuse the solder thereon.

5. In a device for connecting fin section members to a tube member wherein one of said members is provided with a solder insert, a plurality of jig members each comprising a body formed to receive a fin section and spaced seat portions engaging said tube with said fin sections in intimate engagement with the tube, means on each jig member for attachment to an adjoining jig member to form a chain of jig members, a heating element, and means for moving said jig chain and accompanying tube and fin sections over said heating element to fuse the solder thereon.

6. In a device for connecting fin section members to a tube member wherein one of said members is provided with a solder insert, a plurality of jig members each comprising a body formed to receive a fin section and spaced seat portions engaging said tube with said fin sections in intimate engagement with the tube, means on each jig member for attachment to an adjoining jig member to form a chain of jig members, a heating element, means for moving said jig chain and accompanying tube and fin sections over said heating element to fuse the solder thereon, and means engaging said jig members during transit to clamp them to said tube.

7. In a device for connecting fin section members to a tube member, wherein one of said members is provided with a solder insert, a jig chain comprising a plurality of detachably connected jig members, each jig member having an open pocket for receiving a fin section and spaced seat portions engaging said tube with said fin sections in intimate engagement with said tube, a heating element, conveying means adapted to progressively engage the jig members of said chain to move the same over said heating element whereby said solder is fused, and means engaging said jig chain during transit to clamp the jig members to said tube.

8. In a device for connecting fin section members to a tube member wherein one of said members is provided with a solder insert, conveying means comprising sprocket members, a pair of endless chains thereon, said chains having parallel opposed portions, drive means for said sprockets for imparting a unidirectional movement to said opposed portions of said chains, jigs adapted to be received between said chain portions, said jigs being formed to engage opposite sides of said tube and having portions for receiving said fin sections in intimate engagement with said tube, a pressure pad device adjacent each chain section for forcing said chain sections toward each other for frictional engagement with said jigs, and a heating element between said chain sections for heating the tube and fin sections during transit to fuse the solder thereon.

9. In a device for connecting fin section members to a tube member, conveying means, drive means therefor, jig means formed to engage said tube and to receive a fin section in intimate engagement with said tube, said jig member and accompanying tube and fin section being adapted to be fed into said conveying means for movement thereby, means for heating said tube during transit, a solder wire supply, means for feeding the wire onto said heated tube, a driving connection between said conveyor and said last named means, and clutch means operated by the jig member for connecting said driving connection for operation by said conveyor.

10. In a device for connecting fin section members to a tube member, conveying means, drive means therefor, jig means formed to engage said tube and to receive a fin section in intimate engagement with said tube, said jig member and accompanying tube and fin section being adapted to be fed into said conveying means for movement thereby, means for heating said tube during transit, a solder wire supply, means for feeding the wire onto said heated tube, a driving connection between said conveyor and said last named means, and clutch means operated by the jig member for connecting said driving connection for operation by said conveyor, and pressure pad means engaging said jig during transit to clamp said jig to said tube.

11. In a device for connecting fin section members to a tube member, conveying means, drive means therefor, jig means formed to engage said tube and to receive a fin section in intimate engagement with said tube, said jig member and accompanying tube and fin section being adapted to be fed into said conveying means for movement thereby, means for heating said tube during transit, a solder wire supply, a pair of rolls, a driving connection therefor, said rolls being arranged to withdraw wire from said supply and to flatten the same, guide means for receiving the flattened wire and directing it to said heater tube, and clutch means operated by the jig member for connecting said driving connection for operation by said conveyor.

12. A machine for integrating assembled parts comprising a pair of spaced conveying members adapted to engage and convey work holding jigs, means for driving the conveying members, means for feeding material to the work in the jigs conveyed by the conveying members, and means controlled by the jigs conveyed by said members for actuating the material feeding means.

13. A machine for integrating assembled parts comprising a pair of spaced conveying members, means for driving said members in unison in the same direction, a pair of opposed jig members adapted to be inserted between said conveying members for movement thereby, each jig member being articulated to form a plurality of sections each adapted, in cooperation with the opposed section of the remaining jig member, to hold work to be integrated in assembled relation, and means disposed in the space between the conveying members for integrating the assembled parts passing therebetween.

STANISLAUS PRZYBOROWSKI.